Jan. 21, 1964   H. STRAUB   3,118,319
CHANGE SPEED GEAR WITH ENGINE CONTROL
Filed Aug. 11, 1960   2 Sheets-Sheet 1

Inventor:

Jan. 21, 1964     H. STRAUB     3,118,319
CHANGE SPEED GEAR WITH ENGINE CONTROL
Filed Aug. 11, 1960     2 Sheets-Sheet 2
|   | $B_1$ | $K_1$ | $K_2$ | $B_2$ | $K_3$ | $B_3$ |
|---|---|---|---|---|---|---|
| 1. |   | × |   | × |   | × |
| 2. | × |   |   | × |   | × |
| 3. |   | × |   | × | × |   |
| 4. | × |   |   | × | × |   |
| 5. |   | × | × |   |   | × |
| 6. | × |   | × |   |   | × |
| 7. |   | × | × |   | × |   |
| 8. | × |   | × |   | × |   |
PRIOR ART    Fig.2
|   | $K_1$ | $B_1$ | $B_2$ | $B_3$ | $B_4$ | $K_2$ |
|---|---|---|---|---|---|---|
| 1. |   |   |   | × | × |   |
| 2. |   |   |   | × |   | × |
| 3. |   |   | × |   | × |   |
| 4. |   |   | × |   |   | × |
| 5. |   | × |   |   | × |   |
| 6. |   | × |   |   |   | × |
| 7. | × |   |   |   | × |   |
| 8. | × |   |   |   |   | × |
Fig.4
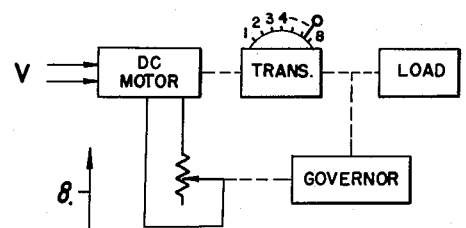
Fig.7
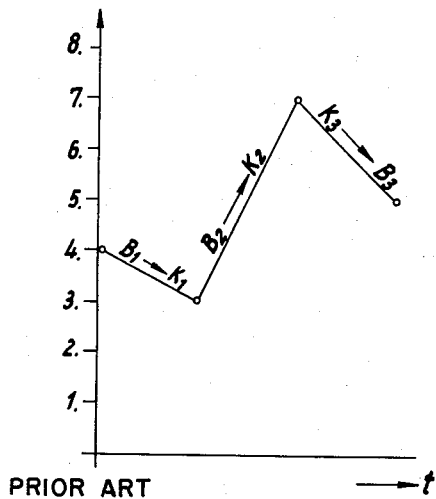
PRIOR ART    Fig.5
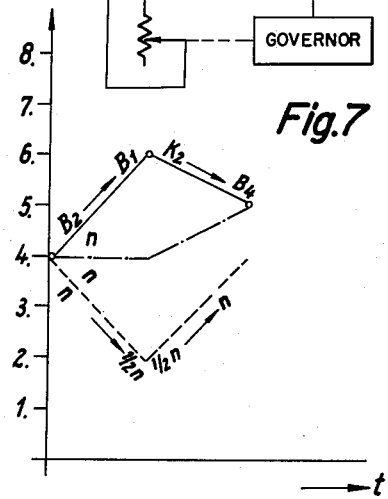
Fig.6
Inventor:

United States Patent Office 3,118,319
Patented Jan. 21, 1964

3,118,319
CHANGE SPEED GEAR WITH ENGINE CONTROL
Hermann Straub, Friedrichshafen, Germany, assignor to Zahnradfabrik Friedrichshafen, Aktiengesellschaft, Friedrichshafen, Germany
Filed Aug. 11, 1960, Ser. No. 49,105
Claims priority, application Germany Aug. 12, 1959
2 Claims. (Cl. 74—472)

This invention relates to gear transmissions and more particularly to transmissions for effecting smooth shifting under load.

In the machine tool industry, where high cutting speeds are used, for example 500 m./min., it is necessary that shifting speeds be made smoothly and without jerking, particularly where ceramics are being cut. Even cutting pressure of the tool on the work is essential at all times. Accelerations and decelerations resulting in uneven tool cutting pressure are injurious.

Although an ordinary shift gear type of transmission is usable to give suitable smooth shifting, where a great many speed changes or range of speeds are required, the bulkiness of an ordinary series gear transmission becomes objectionable or impractical. Accordingly, where a large range of speeds is required, coupled gear groups, such as a plurality of planetary systems, are used. An objection, however, through the use of planetary systems is the fact that in changing from one speed to the next higher or lower speed there is a brief through-connection to a far lower or far higher speed, as the case may be. This sudden acceleration or deceleration on the driven shaft is highly undesirable since it varies the cutting pressure on the tool and could lead to tool breakage.

There are ways of overcoming this drawback, but it would require fairly complex time-control systems, such that only the final desired speed actually becomes effective. However, such systems would require a specific time-control compensation or adjustment for each of the various speeds which would lead to a very complicated and expensive control apparatus and, at best, such control in operation would not be stable during the gear shifting process. It is also possible to brake the driven shaft during a change in speed in order to eliminate jerks, that is, quick and undesirable speed changes due to simultaneous coupling of two speeds in transmissions where it is necessary to shift to two or three speeds in order to get to the desired speed. If the driving element, for example an electric motor is of a suitably large size, the increase torque requirement or extra load during speed change compensating braking can be handled. However, the overload torque of the motor must, of course, not be exceeded and, in any event, the driven shaft will always be slowed.

It is an object of the invention to provide a transmission and a method of use such as to effect smooth shifting up or down speed.

It is another object of the invention to provide a transmission and method of use in combination with conventional motor speed control elements such that smooth shifting may be accomplished using a driving motor for the machine tool not materially larger or more expensive than that which would normally be used.

Briefly, the invention comprises a method wherein a planetary gear transmission is shifted either up or down speed by initially going one speed beyond the desired speed while at the same time compensating for such increase or decrease by decreasing or increasing the motor r.p.m. Subsequently, the transmission is shifted to the desired speed and once more the motor speed is changed, but this time merely to come back to normal, whether such motor speed change be higher or lower in order to bring the motor back to normal speed. In other words, if a shift is desirable from say second to third speed, the gear transmission is changed over from second to fourth speed, in the first instance, and the motor speed is reduced a proportionate amount to compensate for the overspeed. Subsequently, the transmission is shifted down to third speed, the desired speed, and the motor speed brought up to normal. When it is desired to shift from say third speed to second speed, a reverse sequence of events is followed, that is, shifting down to first speed, raising the motor speed, shifting up to second speed, lowering the motor speed to normal.

A preferable type of motor would be a three-phase short-circuited rotor motor of pole-changing type. Any suitable speed sensing a feed-back control system of conventional construction and arrangement may be used to sense the speed change of the driven shaft and control the speed of the motor inversely, as required in accordance with the above general description. Actually, the speed change of the motor is only of short duration, the pole-changing connections, for example, being of 10% duration whereby only a minor change in motor size as compared with a motor that would normally be used, being required.

It will be noted that the feedback system may take the form of an r.p.m. responsive device coupled with a servomotor, or by a frequency responsive relay system, or by a tachometer-generator system, working through suitable amplifier means, etc. In any event, the particular type of feedback control arrangement is not critical or limiting on the invention and any commercially obtainable or readily constructed system may be used, within the knowledge of persons skilled in this art.

It will, of course, be obvious that a variable pole motor is not essential but any suitable type of speed changing motor could be used. For example, a direct current motor regulated in the usual way by field excitation change or change in armature voltage.

The invention of the transmission herein is such that only one clutch or coupling is changed at one time in going from one speed to two speeds higher or lower as the initial step in arriving at the desired higher or lower speed. As explained above, the driving motor has its speeds changed in order to compensate for the consequent load change.

Within the contemplation of the invention are systems wherein speed is changed in more than the two phases described above. It will be understood that various types of electric motors may be used to more advantageously combine any operation with any particular multi-phase shifting method.

A more detailed description of the invention will now be given in conjunction with the appended drawing in which:

FIGURE 2 is a chart showing the specific brakes and clutches in their open and closed positions for an eight speed transmission, as shown in FIGURE 1;

FIGURE 4 is a chart showing the specific brakes and clutches in their open and closed positions for an eight speed transmission, as shown in FIGURE 3;

FIGURE 5 is a graph of the shift phases for the transmission of FIGURE 1 in changing from fourth to fifth speed, as against time; and FIGURE 6 is a graph of the shift phases for the transmission of FIGURE 3 in changing from fourth to fifth speed, as against time.

FIGURE 7 is a block diagram showing one form of speed responsive control system for the transmission of the invention.

Figure 1:
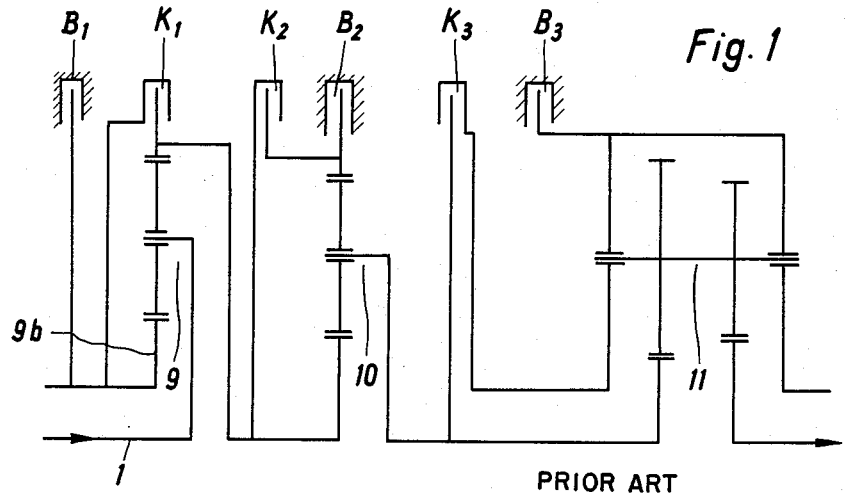
FIGURE 1 is a gear transmission schematic of conventional planetary groups as now used in machine tools.

Referring now to FIGURE 1, a conventional planetary gear transmission is symbolically illustrated having the usual brakes $B_1$, $B_2$ and $B_3$ and clutches $K_1$, $K_2$ and $K_3$ for gear groups 9, 10 and 11. Coupling and braking of the various gear groups effect eight speed changes. By referring to FIGURE 2, it will be noted that a change from one speed to the next speed involves the engagement or disengagement of three clutches. Thus, gear group 9 is in direct connection with drive shaft 1 and rotates bodily (due to closure of clutch $K_1$) for all odd numbered speeds. Sun gear 9b is braked at all other speeds.

Gear group 10 is effective in first to fourth speed by closing brake $B_2$; in fifth to eighth speed, group 10 rotates bodily due to closing of clutch $K_2$. Gear group 11 is effective in the first, second, fifth and sixth speed by closing brake $B_3$. The same gear group rotates bodily, by closing clutch $K_3$ (brake $B_3$ being open) for the third, fourth, seventh and eighth speeds. In shifting from fourth to fifth speed, it is necessary to run through third and seventh speeds or third and second speeds due to the need for closing the clutches $K_1$, $K_2$ and $K_3$. As a result, there is undesirable acceleration in the driven shaft, which shaft is indicated by the arrow at the right-hand of the diagram. FIGURE 5 illustrates the three-phase shifting of the transmission in the required steps of opening and closing brakes and clutches. Obviously, if the shift is down speed, that is, from fifth to fourth, the driven shaft is given an undesirable deceleration due to the triple clutching and/or braking.

Figure 3:
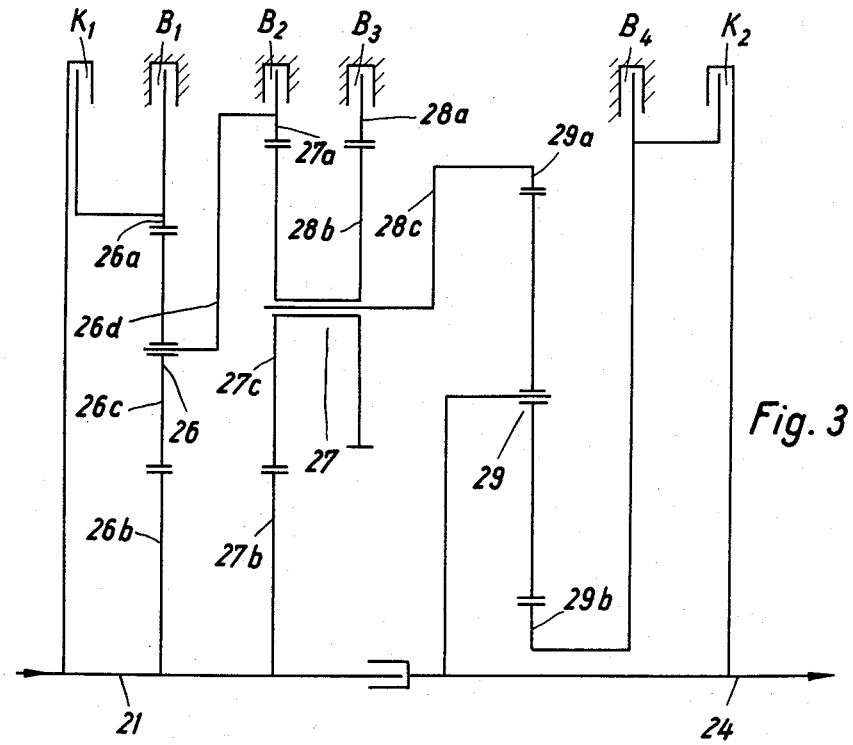
FIGURE 3 is a planetary group schematic of a transmission particularly intended for use in the method and system of the invention.

Referring now to FIGURE 3, there is shown a novel transmission which overcomes the need for triple phase shifting; in that only one or two clutches need be operated at each speed change.

Thus, in FIGURE 3, there is shown a drive shaft 21 and a driven shaft 24. Drive shaft 21 carries a sun gear 26b of gear group 26 having its ring gear 26a arranged to be braked by brake $B_1$. Clutch $K_1$ connects the ring gear to drive shaft 21 when it is desired to by-pass the planetary gear system 26, that is this system then rotates with shaft 21, brake $B_1$ being then open, of course. Spider or bridge 26d connects planet pinions 26c to ring gear 27a of the next planetary gear group 27. Ring gear 27a can be braked by brake $B_2$. The corresponding sun gear 27b is fixed on drive shaft 21. Planet pinions 27c are carried on a common shaft with an additional planet pinion set 28b meshing with ring gear 28a. The common hollow shaft of planet pinion sets 27c and 28b rotates freely on the shaft (as shown) connected to bridge 28c which connects to ring gear 29a of gear group 29. Sun gear 29b of gear group 29 can be braked by brake $B_4$ or coupled to driven shaft 24 by clutch $K_2$. As shown, the bridge for gear group 29, connecting to the planetary gear intermediate ring gear 29a and sun gear 29b, is fixed to driven shaft 24. The gear transmission described above requires the manipulation of only one or two clutches for each speed change. Thus, to change to a higher gear, the speed change is first effected to the gear higher than the desired gear. For example, in shifting from second to third, the first phase of shifting is to fourth speed or in shifting from fourth to fifth, the first phase is to sixth speed. The overspeed in this first phase is compensated for by reduction of motor speed through any conventional feedback system responsive to driven shaft r.p.m. Actually, this first phase of the shifting is very short and the motor is reduced for only about 10% of the complete shifting tme. As explained hereinabove, in the course of the second phase of the shifting, that is, from the overspeed gear back to the desired speed, the motor speed is controlled back to normal r.p.m. Although preferably a slightly larger motor is desirable, a normal size motor could be used with only a small output reduction at normal r.p.m.

As shown in FIG. 7 a simple system can be utilized for the purpose of effecting automatic control of a motor which drives the transmission. Thus, the governor which may be of any conventional type controls the position of the rheostat which in turn controls the speed of the motor fed by the lines V. The broken lines indicate mechanical shaft connections between the motor, the transmission, the load, the governor and the rheostat. The solid lines schematically show the electrical connections. It will, of course, be appreciated that this is a very elemental type of control and that more sophisticated systems are usable, all well within the knowledge of persons skilled in automatic control technology.

Attention is called to FIGURE 4, which shows the various clutch and brake changes required for the various speeds and it will be noted that there is one less change per speed as compared with the chart of FIGURE 2.

Attention is also called to FIGURE 6 which shows the two phase shift in going from fourth to fifth speed as against the three-phase shift shown in FIGURE 5 for the usual planetary gear transmission.

Having thus described the invention, it is apparent that changes may be made without departing from the spirit thereof and, accordingly, it is not desired to limit the invention to the exact embodiment shown, except as set forth in the appended claims.

What is claimed is:

1. A speed change system comprising in combination at least three planetary gear devices, each said device comprising a sun gear, planet gears and a carrier, and a ring gear; a drive shaft 21 and a driven shaft 24, the sun gears 26b; 27b of two of said devices being connected to said drive shaft and the carrier 29 of the third device being connected to said driven shaft 24, a clutch $K_1$ for connecting the ring gear of the first of said devices to said drive shaft and a brake $B_1$ for said ring gear, the carrier 26 of said first device being connected to the ring gear 27a of the second of said devices and a brake $B_2$ for said ring gear, an additional planet carrier 27 common to the planet carrier of said second device and having planet gears 28b and a ring gear 28a meshing therewith and a brake $B_3$ for said ring gear, the ring gear 29a of said third device being connected to said last-mentioned common planet carrier for rotation therewith, a brake $B_4$ for the sun gear of said third device and a clutch $K_2$ therefor intermediate said sun gear and said driven shaft.

2. A system as set forth in claim 1, including in combination therewith a motor for driving said drive shaft, and speed control means for controlling said motor responsive to speed of said driven shaft so as to change speed of said motor inversely with speed change effected by said speed change system, whereby speed may be changed from a given speed to a speed beyond a selected speed and thence to said selected speed with compensation for the change of said speed beyond the selected speed being effected by said speed control means.

References Cited in the file of this patent

UNITED STATES PATENTS

| | | |
|---|---|---|
| 1,979,488 | Perez | Nov. 6, 1934 |
| 2,451,058 | Bennetch | Oct. 12, 1948 |
| 2,917,940 | Voreaux | Dec. 22, 1959 |
| 2,909,078 | Nallinger | Oct. 20, 1959 |